Oct. 12, 1965   D. D. GRIEG   3,212,055
DISTANCE MEASURING SYSTEM
Filed June 22, 1961   5 Sheets-Sheet 1

INVENTOR.
DONALD D. GRIEG
BY
Albert Sperry
ATTORNEY

Oct. 12, 1965     D. D. GRIEG     3,212,055
DISTANCE MEASURING SYSTEM
Filed June 22, 1961     5 Sheets-Sheet 2

INVENTOR.
DONALD D. GRIEG
BY
Albert Sperry
ATTORNEY

Oct. 12, 1965 D. D. GRIEG 3,212,055
DISTANCE MEASURING SYSTEM
Filed June 22, 1961 5 Sheets-Sheet 3

INVENTOR.
DONALD D. GRIEG
BY
Albert Sperry
ATTORNEY

Oct. 12, 1965 D. D. GRIEG 3,212,055
DISTANCE MEASURING SYSTEM
Filed June 22, 1961 5 Sheets-Sheet 4

INVENTOR.
DONALD D. GRIEG
BY
Albert Sperry
ATTORNEY

Oct. 12, 1965  D. D. GRIEG  3,212,055

DISTANCE MEASURING SYSTEM

Filed June 22, 1961  5 Sheets-Sheet 5

INVENTOR.
DONALD D. GRIEG

BY Albert Sperry
ATTORNEY

United States Patent Office 3,212,055
Patented Oct. 12, 1965

3,212,055
DISTANCE MEASURING SYSTEM
Donald D. Grieg, North Caldwell, N.J., assignor to Electronic Research Associates, Inc., Cedar Grove, N.J., a corporation of New Jersey
Filed June 22, 1961, Ser. No. 118,933
10 Claims. (Cl. 340—3)

This invention relates to distance measuring systems, and more specifically relates to a system for underwater distance measurement.

As features of the invention, the depth of water a predetermined distance ahead of a boat is automatically indicated, either by itself or in combination with the immediate depth beneath the boat and the distance ahead of the boat which is free of obstacles. All of these measurements may then be electronically processed by a novel compensating means which compensates for the relatively large area searched by a sonar beam, and selects only that information contained at the center of the beam for accurate measurement.

Distance measuring systems of the type to which the invention relates are known in the art, and are shown, for example, in my copending application Serial No. 35,673 filed June 13, 1960, entitled "Distance Measuring Device," now Patent No. 3,122,719 and assigned to the assignee of the present invention.

As set forth in that application, I have previously provided a novel distance measuring device, particularly applicable to small boats such as fishing boats and the like, where sonar measurements are made both in a direction below the boat and in a direction directly forward of the boat. Thus, information can be obtained as to the depth of water under the boat, and to the position of underwater objects such as submerged reefs, sunken ships and schools of fish. Moreover, when the boat is operating at night or in a fog, the forward measuring system delivers information as to the distance of the boat from shore or from nearby boats or other obstructions.

Again, the depth measuring system can be used for navigational purposes where the underwater terrain is charted, whereby a continuous measurement of the underwater depth will give the operator figures to superimpose on a chart so as to determine his position on a chart.

While measuring distance directly ahead of a boat and directly beneath a boat are of great advantage, each measurement overlooks the more significant information of the depth of water which the boat is headed for, and possible underwater obstacles in the path of the boat, but not yet reached by the boat. In order to monitor the water depth ahead of the boat, and avoid the danger of running into hidden obstacles, I provide a novel slant depth indicator which searches out the area under water and in front of the boat, and converts this information into a measurement of the depth of the water ahead of the boat in an instrument driven by the system.

By obtaining such slant depth measurement, it will also be apparent that I can more easily locate schools of fish and fishing grounds ahead of, but not below, the boat, so that a boat can now be maneuvered toward such fishing grounds.

Moreover, the slant depth indication permits navigation through narrow channels, since the slant depth indication gives the pilot of the boat an opportunity to select the deepest water in which to sail.

In a preferred embodiment of the invention, a transducer which could, for example, be a piezoelectric element, is connected beneath the boat and arranged to focus a relatively tight sonar beam at an angle of, for example, 45° with respect to the surface of the water.

In the usual manner, the transducer generates a pulse comprised of a high frequency ultrasonic signal, and at the same time a timing means is caused to begin timing. When these ultrasonic signals intercept an obstacle, they will be reflected back to the transducer as an echo, and upon their reception, the transducer generates a signal which controls the timing means so as to indicate an end of the timing cycle. By way of example, a neon bulb rotating around a dial surface at a constant speed can cause the initial generation of the high frequency ultrasonic signal from the transducer when the bulb pases a zero position on the dial. When the echo of the ultrasonic signal is received, the neon bulb can be caused to flash. Depending upon the speed of rotation of the neon bulb, and the speed of sound through water, the distance through which the bulb has passed on the indicating dial until it flashes is a function of the distance of the obstacle or surface which caused the reflected sound wave.

The information so obtained will, of course, be directly related to the actual distance from the transducer to the reflecting obstacle which is forward of the boat. However, this distance can be easily related to the depth of the water at that forward point when the angle at which the sonar beam travels is fixed, as due to a predetermined positioning of the transducer with respect to the boat.

Thus, the dial surface can be calibrated to be equal to the actual distance measured times the sine of the angle which the transducer beam makes with respect to the surface of the water.

In a particular instance, for example, the beam can be caused to travel at a 45° angle with respect to the surface of the water, whereby the indicator scale would be calibrated to be the actual distance between the transducer and reflecting obstacle times the square root of 2. In this particular instance, the indicator will not only give the actual depth of the forward obstacle beneath the water, but also the forward distance from the boat to the obstacle.

In addition to the single indication of slant depth, I have further combined in the system, measuring means which will also indicate actual vertical depth and/or actual distance of the boat from some forward obstacle.

All of these parameters, or any two of them, can be given on a single indicator means by assigning a first indicator scale to one of the parameters, and a second indicating scale to a second of the parameters with the neon bulb being flashed for each respective scale portion.

If desired, it is possible to have only a single indicating scale and a switching means which will select any one of the desired parameters to be measured.

In transferring from the slant depth measurement to either the distance or vertical depth measurement, it will be seen that there must be a scale correction, since the slant depth measurement is actually a function of the actual linear depth from the transducer to the obstacle. I have found that rather than causing differently calibrated scales on the same instrument to correct for this function, I can also alter the speed of rotation of the indicating means by this function when slant depth is to be measured, so that a single scale can be used for any of the measurements.

From the foregoing, it is a primary object of this invention to provide a novel distance measuring system particularly applicable to underwater measurement.

Another object of this invention is to provide a novel inexpensive underwater measuring system.

A further object of this invention is to provide a novel measuring means for measuring distances under water of points forward of a boat.

Yet a further object of this invention is to provide a novel underwater distance measuring system which will indicate either the slant depth of an obstacle forward of a boat, the vertical depth of water directly beneath the boat, or the distance from the boat to a forward obstacle.

Another object of the invention is to provide novel means for measuring the distance between a transducer and an obstacle forward of and below the transducer, and generating a reading which is equal to the vertical component of this distance.

When using beamed energy in the manner described above, where the reflection of this beamed energy is to generate signals relating the distance between the radiating source and the reflecting object, many problems arise because of the relatively wide area which may reflect the beam. That is to say, when a single pulse is generated by a transducer, the beam will widen as it travels outwardly so that if it falls upon a relatively flat surface there will be reflections which could possibly come from each point on the surface. Clearly, all of the points which reflect the beam will not be the same distance from the transducer, so that the reflected signal will be considerably wider than the original generated pulse, and can, therefore, reduce the sensitivity of the indicating instrument, since a relatively wide range of distance will be indicated, rather than the desired distance along the center of the radiated beam.

This problem is substantially aggravated in the case of slant depth measurements, and distance-ahead measurements, since the area encircled by the radiated beam will have points that widely differ from one another in their distance to the radiating transducer.

In accordance with the present invention, I provide a novel processing circuitry which, in effect, selects the center portions of the reflected signal, which center portions would correspond to the center of the radiating beam, and thus give information as to the distance to the point which lies along the center line of the radiated beam. Thus, where this signal is used to flash a neon bulb which moves around an indicating scale, there will be a sharp light pulse for a very short time at the center of the signal corresponding to the central point of the area upon which the sound wave impinges. In the absence of the novel circuitry, a relatively long streak of light would sweep over a distance on the indicating scale which is equal to the maximum distance from the transducer to the object receiving the ultrasonic pulse minus the smallest distance between the transducer and the area receiving the ultrasonic pulse.

It is, therefore, a further object of this invention to provide a novel processing circuit means for selecting only a predetermined portion of the reflected signal in a distance measuring device.

A further object of this invention is to provide novel electronic means for decreasing the spread of an echo signal.

A further object of this invention is to provide a novel processing circuit for receiving the signal generated responsive to the echo of an ultrasonic impulse which selects only the highest intensity portions of the impulse.

These and other objects of this invention will become apparent from the following description when taken in connection with the drawings in which:

FIGURE 11 shows a further embodiment of an instrument which can simultaneously indicate each of slant depth, vertical depth and distance.

Figures 1, 2, 3, 4:
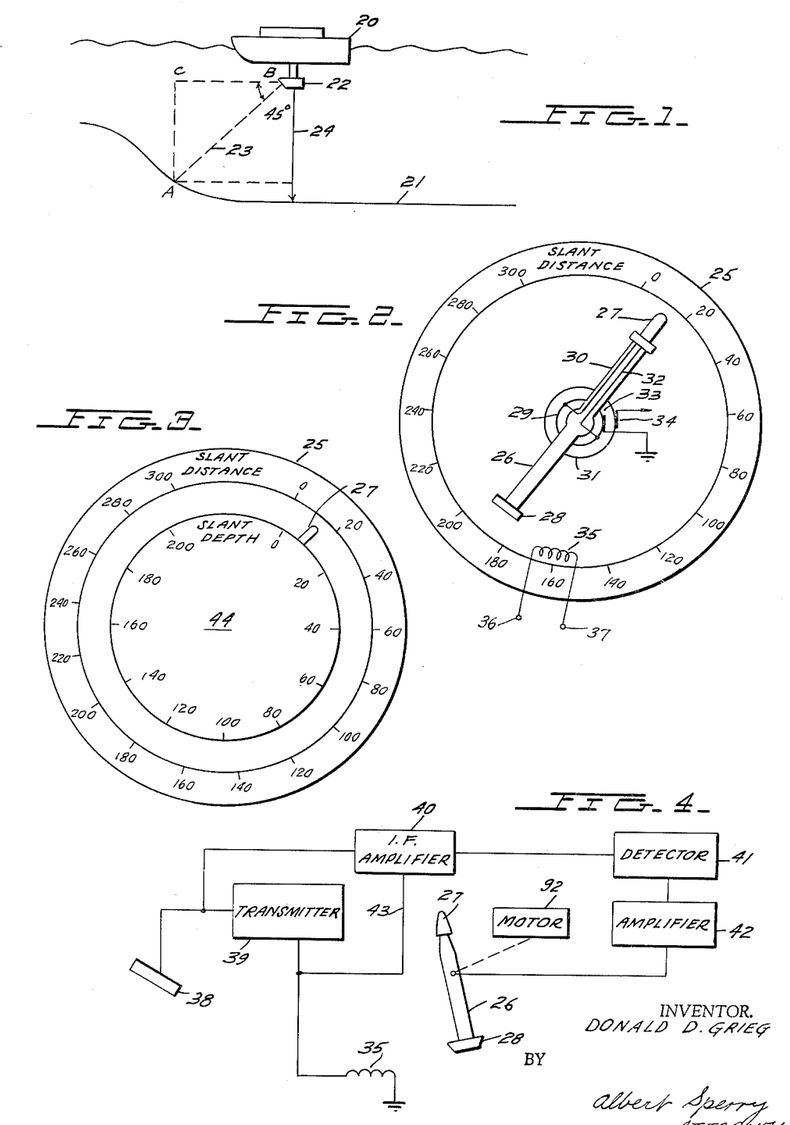
FIGURE 1 schematically illustrates a small boat equipped with a transducer for generating ultrasonic signals in a slant and vertical direction.
FIGURE 2 illustrates a portion of the dial face, and a portion of the circuitry for indicating the slant distance determined from the ultrasonic energy of the transducer of FIGURE 1 generated in the slant direction.
FIGURE 3 illustrates the complete dial surface of the instrument of FIGURE 2 where slant depth is calibrated on an inner dial surface as a function of the angle which the transducer beam makes with respect to the water.
FIGURE 4 is a schematic block diagram of the electrical system used for the indicator of FIGURES 2 and 3, and particularly illustrates the connection between standard electronic components used in the system.

Referring first to FIGURE 1, I have shown therein a small boat 20 which floats with respect to the bottom surface 21 which has an irregular shape, as indicated, and could, for example, contain hidden shoals or schools of fish or other objects which the boat pilot must be aware of for effective navigation.

The bottom of boat 20 has a transducer 22 secured thereto which, in accordance with the invention, generates ultrasonic signals along slant line 23 and toward bottom surface 21. Moreover, the transducer 22 can also generate an ultrasonic signal along line 24 for purposes of measuring the vertical depth of the water with respect to transducer 22.

Transducer 22 is perferably of the type disclosed in my copending application Serial No. 118,890, filed June 22, 1961, entitled Depth Ahead Adapter for Sonar Systems and assigned to the assignee of the present invention, and reference is made thereto for details of the structure of this element.

As indicated above, my prior application Serial No. 35,673 discloses a system for indication of vertical depth from transducer 22 to surface 21. This, however, is often insufficient for purposes of safe navigation, since a pilot is vitally interested in the water depth ahead of his boat so that dangerous conditions can be avoided and the boat can be safely navigated.

For this purpose, and in accordance with the present invention, an ultrasonic beam 23 which can, for example, have a beam spread of 8°, is generated at some predetermined angle with respect to the water surface. In a particular embodiment of the invention, and as illustrated in FIGURE 1, this angle is 45°.

As will be shown hereinafter, the transducer and its electrical system will cause an indicator to directly indicate the distance from the transducer 22 to the point A on surface 21 which lies in the center of the radiated ultrasonic beam from transducer 22.

By knowing this distance, and by also knowing the angle which beam 23 forms with the water surface, it is clear that the distance AC which is the depth of water forward of the boat by a distance BC can be determined. That is to say, distance AC is the distance $AB/\sqrt{2}$ since a 45° angle has been selected.

The use of the 45° angle also means that the distance BC is equal to the depth of water at the forward point so that a pilot will automatically know from the indicator which is appropriately calibrated what the slant depth water depth is (AC), and how far ahead of his boat this depth exists (BC).

A typical indicator and electrical system for presenting this information is shown in FIGURES 2, 3 and 4. Referring first to FIGURE 2, I have shown an indicator dial face 25 which is calibrated from zero to 300 feet in terms of slant distance which is the actual distance AB measured in FIGURE 1.

A motor-driven indicator pointer 26 is swept around dial surface 25 at some constant speed, and has a neon bulb 27 at one end and a signal generating means such as a small permanent magnet 28 at its other end.

The bulb 27 has its first terminal connected to slip-ring 29 by conductor 30, and its second terminal connected to slip-ring 31 by conductor 32. Slip-ring 29 is then connected to ground by brush 33, while slip-ring 31 is connected to an ultrasonic transmitter system through the brush 34.

The indicator is then provided with an appropriately positioned coil 35 which is in close proximity to the sweeping permanent magnet 28 so that, as magnet 28 sweeps past coil 35, it generates a voltage pulse at terminals 36 and 37 of coil 35. Moreover, the coil 35 is so positioned that this signal is generated as the neon bulb 27 sweeps past zero distance marker on dial 25. The pulse generated in coil 35 acts as a synchronizing pulse for the system, and begins a measuring time during which neon bulb 27 moves along the length of the indicating dial at a constant speed.

This will be better understood by reference to FIGURE 4 which shows a block diagram of the electrical system. Thus, in FIGURE 4, I schematically illustrate a transducer 38 arranged to generate a slant beam such as beam 23 of FIGURE 1.

The transducer 38 is connected to a transmitter 39 which is adapted to apply a relatively high frequency voltage for a discrete interval of time to transducer 38. By way of example, transmitter 39 can apply a frequency of the order of 200 kilocycles to the electrodes of transducer 38 to thus cause transducer 38 to vibrate in an appropriate direction to cause generation of the slant ultrasonic signal at the same frequency of 200 kilocycles.

The transmitter is turned on only when a voltage pulse is being generated in coil 35 so that the pulse from transmitter 39, and thus from transducer 38, will exist for only a short discrete time.

The ultrasonic pulse is generated and then radiates outwardly, as usual, and assuming that it strikes an obstacle within the distance range of the instrument, it will reflect a high frequency pulse signal which is received as an echo by transducer 38. This causes transducer 38 to generate a signal at the frequency of the pulse which is applied to the intermediate frequency amplifier 40.

The output of amplifier 40 is then applied to detector 41 which converts the small burst of high frequency energy from the amplifier 40 into a unidirectional pulse, and this unidirectional pulse is then applied to amplifier 42.

The output of amplifier 42 is then connected to brushes 33 and 34 (FIGURE 2) which are electrically connected to conductors 30 and 32 respectively, whereby, for the duration of the pulse transmitted by amplifier 42, the neon bulb 27 will be lit. Hence, if the object which causes reflection of the ultrasonic signal is 200 feet from the transducer, the time taken from the ultrasonic signal from transducer 38 to go to the obstacle and be reflected back to transducer 38 is related to the speed of rotation of pointer 26 in such a manner that when the signal is returned, bulb 27 will be at the 200-foot indication, and will be flashed at that point.

Since the rotation of pointer 26 will be of the order of 10 cycles per second, whereby 10 pulses per second are radiated from transducer 38, the point of light at the 200-foot indication will appear to be a stationary light point, since the human eye will retain an image for approximately 1/10 of a second.

In order to prevent a spurious indication in the area of the zero-foot indication, it will be noted in FIGURE 4 that the coil 35 is connected by line 43 to a cut-off means which will cut off I.F. amplifier 40 during the time that a pulse is generated in coil 35.

From the foregoing, it is seen that the slant distance or the distance from point A to point B in FIGURE 1 is indicated directly on scale 25. Since the slant depth or depth from A to C in FIGURE 1 is the distance from A to B divided by the sine of the angle between beam 23 and the surface of the water, it is now possible to calibrate a second scale in terms of this constant functional relationship. Thus, in FIGURE 1, since the angle is 45°, the distance AC will always be $1/\sqrt{2}$ times the distance measured.

This second scale, which will directly indicate slant depth (as well as the forward distance CB to point A) is shown in FIGURE 3 as scale 44. The scale of dial portion 44 will be seen to be equal to $1/\sqrt{2}$ times the adjacent slant distance reading. Moreover, it will be noted that scale 44 covers the mechanism of pointer 26 and provides only an annular observing area through which bulb 27 may be observed.

Clearly, the pilot now, by observing the position of the light point caused by bulb 27, will immediately know the depth of water ahead of his boat, and can take appropriate measures where this depth becomes dangerously shallow, or indicates the existence of something being sought by the pilot.

While the devices of FIGURES 2, 3 and 4 illustrate an indicator and electrical driving system for measuring only a single parameter and some function of the measured parameter (actual distance AB in FIGURE 1 and component AC respectively), it is possible to simultaneously present two independent parameters on the indicating device.

In FIGURE 1, a sonar beam 24 is generated downwardly to obtain a measure of vertical depth below the boat.

Figure 5:
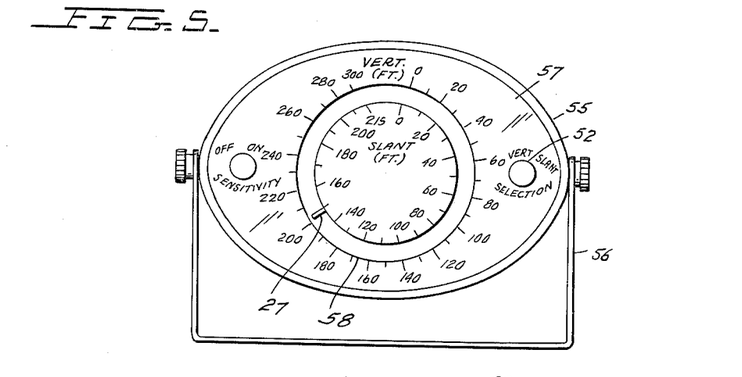
FIGURE 5 is a front plan view of an indicator dial and housing having an indicator surface which can select between slant depth measurement and vertical depth measurement.

In FIGURE 5, which is the preferred embodiment of the invention, I have shown an instrument and housing therefor which cooperate with a transducer which generates both beams 23 and 24 in FIGURE 1, whereby either a vertical depth reading or slant depth reading can be selected.

Figure 6:
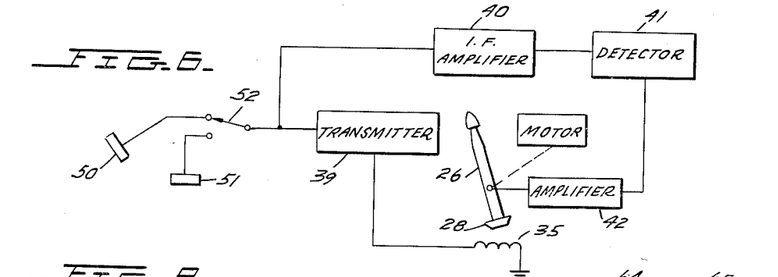
FIGURE 6 is a block diagram of the electrical system contained within the housing of FIGURE 5.

Before considering the indicator of FIGURE 5, its electrical system should be first understood, as illustrated in FIGURE 6. As shown in FIGURE 6, the transducer system includes two transducers 50 and 51 which are, for example, mounted as shown for transducer 22 in FIGURE 1. The manner in which the two transducers 50 and 51, which generate a slant depth beam and depth below beam respectively, are contained within a common housing, is shown in my copending application Serial No. 118,890, filed June 22, 1961 noted above.

In FIGURE 6, a pointer 26, similar to that shown in FIGURES 2 and 4, cooperates with a synchronizing pulse generator 35 which turns transmitter 39 on each time permanent magnet 28 of pointer 26 passes coil 35. The transmitter 39, however, in FIGURE 6 is selectively connected to one of transducers 50 or 51 by selector switch 52. The remaining circuit elements are identical to those of FIGURE 4, and include the intermediate frequency amplifier 40, detector 41 and amplifier 42. Obviously, dependent upon the position of selector switch 52, pointer 26 will indicate either actual depth ahead (distance AB in FIGURE 1) or the actual depth of the water below the boat.

Turning now to FIGURE 5 which shows the preferred form of the indicating surface, it will be seen that the complete instrument is contained within a housing 55 mounted in a gimbal 56 which is, in turn, mountable on the instrument panel of the boat.

The dial surface 57 has an outer set of calibrations identified as VERT., which is the scale to be read for vertical depth and an inner scale 58, the readings of which are $1/\sqrt{2}$ times the readings of the outer scale, whereby the actual distance AB measured is automatically converted into the distance AC for depth ahead or slant depth measurement.

As was the case with indicator dial of FIGURE 3, only neon bulb 27 is visible, and it will flash in accordance with the measurement of either transducer 50 or 51 and the associated circuitry. The selector switch 52 which selects either a vertical reading or slant reading (for operation of transducer 51 or 50 respectively) is provided directly at the surface of the indicator 57. Obviously, when switch 52 is on the vertical position, the outer scale is read, while when it is on the slant position (for slant depth measurement), the inner scale is read.

Figures 7, 8:
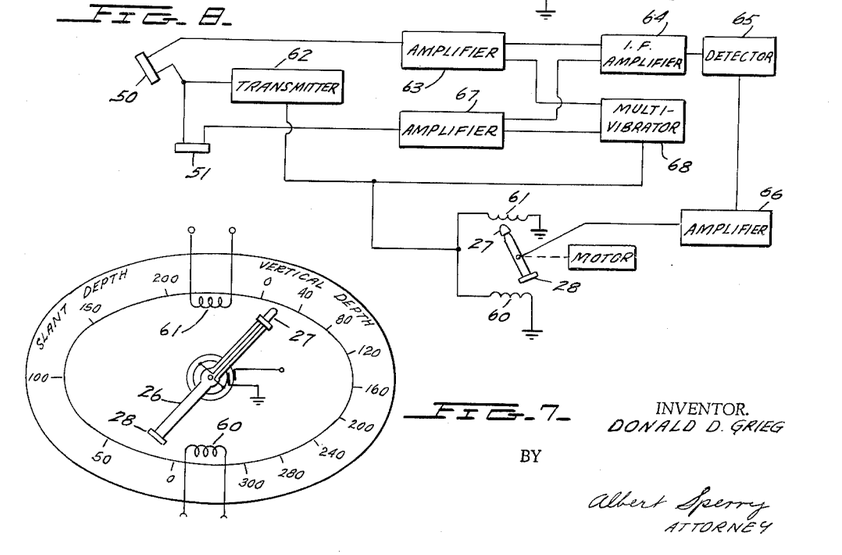
FIGURE 7 shows a further embodiment of the invention where the instrument simultaneously measures and indicates slant depth and vertical depth.
FIGURE 8 is a block diagram of the electrical system for the instrument of FIGURE 7.

In the embodiment of FIGURES 5 and 6, it is seen that only one of the vertical depth or slant depth readings can be taken at one time. Where it is desired to simultaneously present both of these parameters, the system may be modified, as illustrated in FIGURES 7 and 8 where the indicator scale is divided into two halves, as is the indicator device of my above noted copending application Serial No. 35,673. Thus, in FIGURE 7, the indicator scale indicates from zero to 300 feet for vertical depth measurement on its right-hand side, and from zero to 200 feet for slant depth measurement on its left-hand side.

The instrument is modified to include two coils 60 and 61 which each cooperate with permanent magnet 28 of pointer 26. The lower coil 60 is operable to trigger the transmitting and receiving system for vertical depth measurement, while coil 61 triggers the transmitting and receiving system for slant depth measurement.

The electrical driving system for the indicator of FIGURE 7 is shown in FIGURE 8. In FIGURE 8, the transducers 50 and 51 of FIGURE 6 are retained, and are connected to a common transmitter 62. The transmitter 62 is caused to connect a high frequency pulse to both transducers 50 and 51 responsive to movement of permanent magnet 28 of pointer 26 past either of coils 60 or 61.

The transducers 50 and 51 are provided with separate receiving chanenls which are selectively switched on and off in accordance with whether slant depth or vertical depth measurement is to occur. That is to say, transducer 50 is provided with a first channel which includes amplifier 63, I.F. amplifier 64, detector 65 and amplifier 66.

The amplifiers 63 and 67, which define the distinct channels for transducers 50 and 51, are rendered operative by a multivibrator 68, whereby amplifiers 63 and 67 are synchronously turned on and off. The multivibrator operation is, in turn, timed by the output of coils 60 and 61 in any appropriate manner.

Thus, assuming that permanent magnet 28 first sweeps coil 60 to start a vertical depth measurement, the pulse from coil 60 turns transmitter 62 on so that a beam of ultrasonic sound waves are generated by both transducers 50 and 51. At the same time, multivibrator 68 turns amplifier 67 on, and amplifier 63 off. Thus, any echos received by transducer 50 will not be transmitted through the system.

If, however, an echo is received by transducer 51, it is amplified in preamplification stage 67, and then transmitted to the further intermediate frequency amplifier 64. The output of amplifier 64 is then detected in detector 65 which creates a unidirectional envelope of the high frequency pulse output of amplifier 64, and this unidirectional envelope controls amplifier 66 which applies an appropriately timed pulse to the neon bulb 27. Thus, if the echo received by transducer 51 were 200 feet from transducer 51, the neon bulb 27 will light when the 200-foot marking on the vertical depth portion of the scale is reached.

As the pointer continues to rotate, permanent magnet 28 will pass coil 61 to generate the next pulse in the system. This, again, turns on transmitted 62 and causes multivibrator 68 to turn amplifier 67 off, and turn amplifier 63 on, whereby a slant depth measurement may now be made in the same manner indicated above for vertical depth measurement.

Thus, in the embodiment of FIGURES 6 and 7, and assuming that there are obstacles within both the slant depth range and vertical depth range, the pilot will see a light spot on each side of the scale, which will directly indicate both vertical and slant depth. It will be noted that the left-hand scale indicator slant depth is appropriately calibrated to automatically convert the actual distance reading AB of FIGURE 1 to the depth measurement AC, while the vertical depth measurement is calibrated for direct reading of the actual vertical depth measured.

Because of the persistence of vision, the energization of the neon bulb 27 will provide in effect a simultaneous indication of both the vertical and slant depths.

Figure 9:
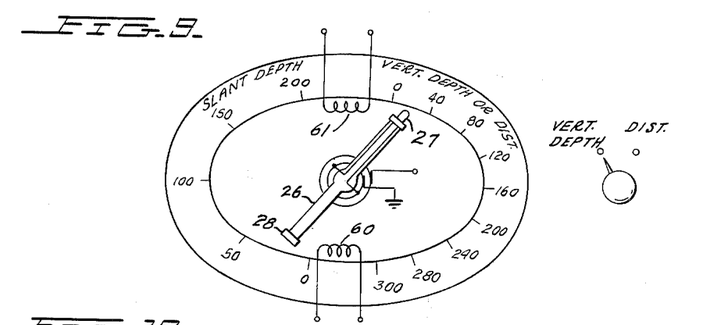
FIGURE 9 shows an instrument of the type shown in FIGURE 7 which is modified to have the vertical depth range of indication of FIGURE 7 to be switched between vertical depth measurement or distance measurement.

If any of three readings; slant depth, vertical depth or distances, are desired, the right-hand vertical depth scale of FIGURE 7 can be modified as illustrated in FIGURE 9.

Figure 10:
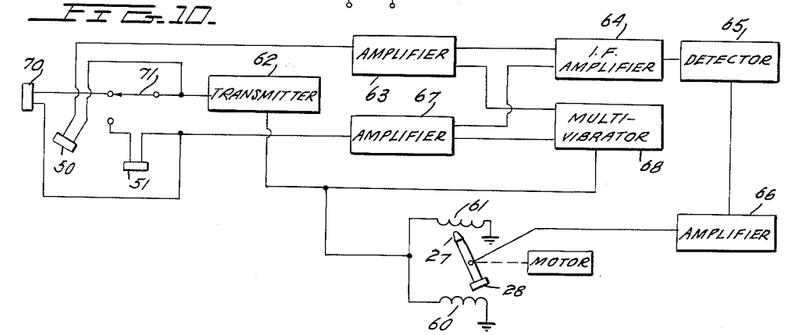
FIGURE 10 is a block diagram of the electrical circuitry used for the instrument of FIGURE 9.

In the electrical schematic diagram of FIGURE 10 which is associated with the indicator of FIGURE 9, a third transducer 70 has been added to the transducer system including transducers 50 and 51 where the transducer 70 generates a horizontal sonar beam for measuring distance ahead in the manner set forth in copending application Serial No. 35,673. The manner in which a transducer can be constructed in a single housing is shown, for example, in my copending application noted above.

Generally, the electrical system of FIGURE 10 is similar to the system of FIGURE 8 except that the transmitter connection to transducer 51 is selectively connectable to transducer 70 through a selector switch 71.

In FIGURE 9, the selector switch 71 is movable between a vertical depth postion which corresponds to its connection to transducer 51, and a distance position which corresponds to its connection to transducer 70. Clearly, the operation of the system will be identical to that described in FIGURE 8 where the slant depth measurement is always provided in combination with either a vertical depth or distance measurement, depending upon the position of selector switch 71.

It will be noted that the vertical depth and distance measurements can use the same calibrated scale, since they are both actual distance measurements.

Figure 12:
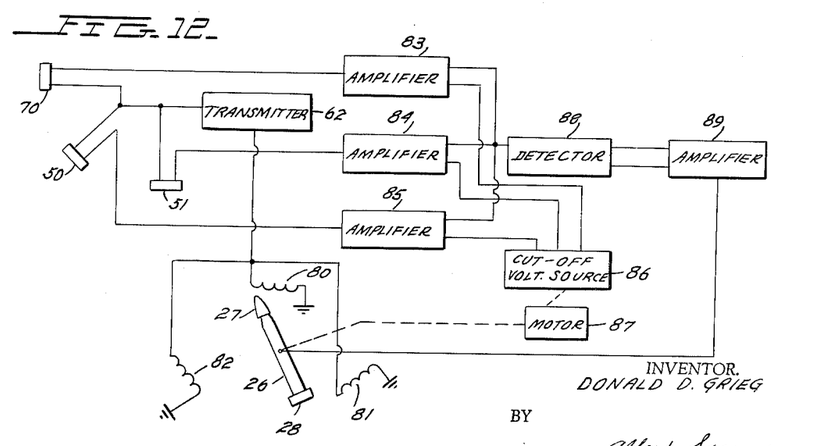
FIGURE 12 is a block diagram of the electrical circuitry for the instrument of FIGURE 11.

Alternative to the structure of FIGURES 9 and 10 where any two of the three parameters can be simultaneously presented, the system of FIGURES 11 and 12 permits the simultaneous presentation of all three parameters. Thus, in FIGURE 11, the indicator scale has three sections. The first section in a clockwise direction is the vertical depth indicating section. This is followed by a distance indicating section and finally a slant depth indicating section.

The electrical system for FIGURE 11 is modified whereby the permanent magnet 28 of pointer 26 cooperates with three synchronizing coils 80, 81 and 82 which are operable to begin timing for vertical depth measurement, distance measurement and slant depth measurement respectively. The block diagram of a typical system for simultaneous presentation of the three parameters is shown in FIGURE 12 which again uses the transducers 70, 50 and 51.

In FIGURE 12, three receiving channels are provided which include amplifiers 83, 84 and 85 for distance transducer 70, vertical depth transducer 51 and slant depth transducer 50 respectively. The appropriate channels are selectively turned on and off by a source of cut-off voltage 86 which is synchronously connectable to two of amplifiers 83, 84 and 85 at any one time. The removal of cut-off voltage is thus swept from amplifier 83 to amplifier 84 to amplifier 85 in a synchronous manner in accordance with the operation of motor 87 which drives pointer 26.

Each of the individual channels then feed into a common detector 88 and amplifier 89 which, in turn, is connected to neon bulb 27 of pointer 26.

The operation of the system of FIGURES 11 and 12 is believed clear from the foregoing descriptions, whereby when magnet 28 sweeps any of coils 80, 81 or 82, it turns on transmitter 62 to thereby energize transducers 70, 50 and 51, respectively. At the same time, and because of the position of motor 87, the cut-off voltage source is removed from the appropriate amplifier channel so that the two channels selected are cut off. By way of example, if coil 80 is being swept to initiate a vertical depth measurement, amplifiers 83 and 85 will be cut off, and amplifier 84 will be operated. Thus, an echo signal which returns to transducer 51 will be transmitted through amplifier 84, detector 88 and amplifier 89 to cause neon bulb 27 to flash within the vertical depth range on the indicator. Operation in the remaining two sectors of the indicating dial, of course, proceeds in an identical manner.

In the embodiment of FIGURE 5, it was seen that the scale for vertical depth measurement is necessarily different from the scale for slant depth measurement. It may be desirable that the same scale calibrations be provided for both slant or vertical depth measurement whereby a common scale will indicate either of these readings, dependent upon the position of a selector switch. This would free a scale for measurement of a different parameter or, if desired, permit leaving the inner scale of FIGURE 5 blank.

Figures 13, 16, 17:
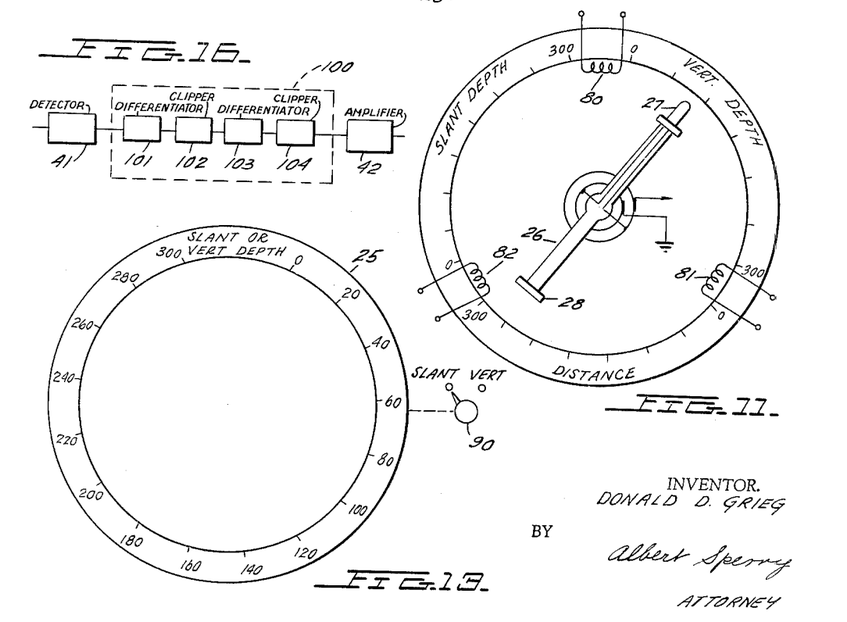
FIGURE 13 shows a still further embodiment of the invention where a common scale can be used for either slant depth measurement or vertical depth measurement by causing the speed of rotation of the indicating means to change in accordance with the angle which the slant beam makes with the surface of the water.
FIGURE 16 is a block diagram of the processing means of FIGURE 15.

I have found that if the speed of rotation of the pointer is changed by a factor $1/\sqrt{2}$ the same scale can be used whether vertical depth or slant depth measurement is taking place, presuming that the transducer for slant depth measurement generates a beam which is at a 45° angle with respect to the surface of the water. This type of system is shown in FIGURES 13 and 14 where the outer scale is captioned "Slant" or "vertical" depth, and a selector switch 90 selects between either the slant depth or vertical depth measurement.

Figure 14:
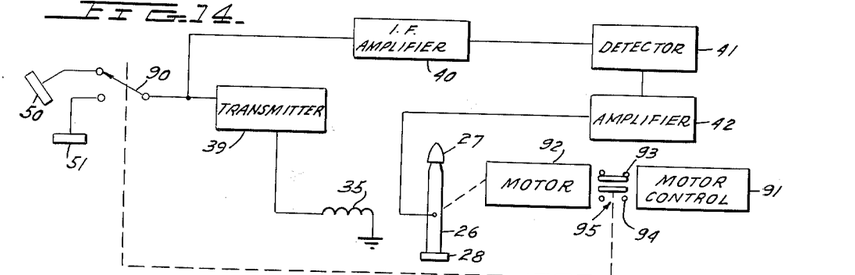
FIGURE 14 is a block diagram of the electrical circuitry used for the instrument of FIGURE 13.

The system for permitting this type of presentation is shown in FIGURE 14 which is similar to FIGURE 6, with the exception of the motor control arrangement. More specifically, in FIGURE 14, a motor for rotating pointer 26 is provided which has two speeds of rotation. By way of example, the motor can be a synchronous motor provided with a controllable gear ratio to an output shaft which will change its output speed. Alternatively, a motor can be provided of the type whose speed is controlled in accordance with the input voltage thereto.

The latter type of motor is shown in FIGURE 14, where the motor control system 91 of motor 92 is such that connection to the circuit which includes contact 93 will cause a first output speed from motor 92, while connection to the circuit which includes contact 94 will cause a second speed of rotation of motor 92. The motor 92 is selectively connected to lines 93 or 94 through a two-pole contacting means 95 which is operable to connect one or the other of the motor control circuits to motor 92.

The position of contact means 95 is controlled by selector switch 90, whereby when the selector switch 90 is connected to transducer 51, the motor 92 will be connected to motor control 91 at contact 94, whereby a first speed of rotation is established for pointer 26. This speed of rotation is appropriate for the direct indication of vertical depth on the scale of the instrument of FIGURE 13. When, however, selector switch 90 is connected to transducer 50, motor control system 91 now changes the output speed of motor 92 by a factor of $1/\sqrt{2}$ whereby the pointer 26 is rotated at a decreased speed so that it will directly indicate slant depth measurement on the relatively enlarged scale normally used for vertical depth measurement.

It will be noted that such a motor control system could also have been applied in the embodiment of FIGURE 9, whereby slant depth could be presented on the right-hand side of the indicator dial with one of the vertical depth or distance parameters, with the scale on both sides of the instrument having a common calibration.

In the foregoing description, a particular type of indicating element has been described which includes the rotating neon bulb which is appropriately flashed some measured distance away from its zero point. Clearly, other types of presentation means could be utilized in connection with the invention which is directed to the novel slant depth measurement and its various combinations with measurement of other parameters.

As has been previously indicated, when a sonar beam is transmitted, it includes a certain angle of spread even when very accurate focusing means are utilized. By way of example, the sonar beam utilized with the present invention can have an angle of approximately 8°. When the beam strikes a distant object, and is reflected therefrom, it is, therefore, reflected over a relatively large surface area, various points of which are at different distances from the generating transducer. Therefore, the signal train received does not have the relatively small width which was originally generated, but will have a relatively wide width. When the beam is generated on an angle, as in slant depth measurement, it will be apparent that this problem is aggravated, since a wider range of distances will be included in the portion of the surface illuminated by the beam. Accordingly, the reflected signal received, for example, in the system of FIGURE 4, will keep amplifier 42 turned on for a relatively long time so that the indicated distance will be a relatively long arc of light generated by neon bulb 27.

In accordance with a further feature of the invention, and to improve the effectiveness of the slant depth measurement, I have provided a novel processing circuit which will, for example, select the central point of the received beam and cause a pulse to be generated only at this central point for lighting the neon bulb. This central point which will, in most cases, correspond to the central line of the transmitted beam, will thus give a more accurate indication of the precise distance which should be indicated by the indicating device.

Figure 15:
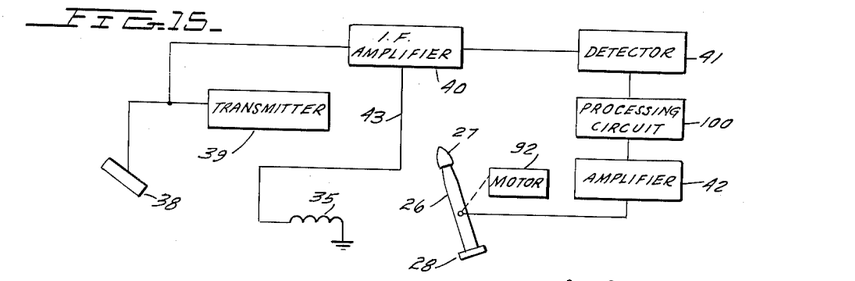
FIGURE 15 illustrates the manner in which the system of FIGURE 4 can be modified to have a processing means connected therein for selecting the center or highest intensity portion of the echo signal.

Thus, in FIGURE 15, I have illustrated how the system of FIGURE 4 is modified with a processing circuit 100 connected between detector 41 and amplifier 42. This processing circuit can take many forms, and is shown, for example, in one form in block diagram in FIGURE 16.

Referring to FIGURE 16, the processing circuit 100 is seen to be more specifically comprised of a first differentiating circuit 101, a first clipper 102, a second differentiating circuit 103, and a second clipper 104. The operation of the processing circuit of FIGURE 16 is best understood from a consideration of FIGURES 17a through 17e.

Figure 17A:
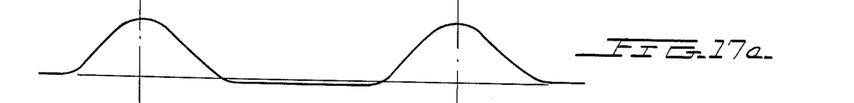
FIGURES 17a through 17e illustrate the wave shapes of the echo signal at various stages within the processing means.
Figure 17B:
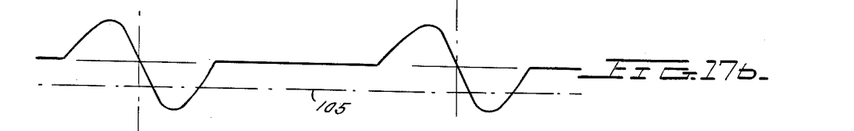
Figure 17C:
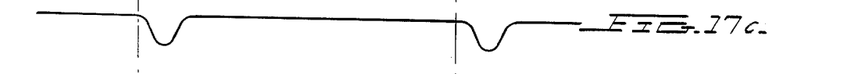
Figure 17D:
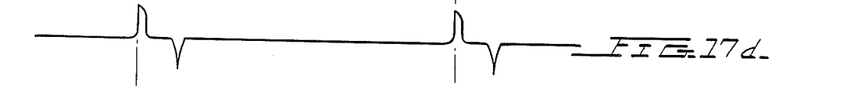

In FIGURE 17a, I have shown the beam envelope output of detector 41 when detector 41 receives a signal. It is to be noted that this beam envelope is substantially wider than the original pulse generated by the transducer 38. This envelope is then connected to the first differentiating circuit 101 which delivers the output wave shape shown in FIGURE 17b. This output signal is applied to the first clipper 102 which has a clipping level 105, whereby the output wave shape coming from clipper 102 is shown in FIGURE 17c. This signal is then applied to the second differentiator 103 which delivers the wave shape shown in FIGURE 17d comprised of symmetrically disposed positive and negative pulses which are applied to the second clipper 104 to eliminate the negative pulses (or positive pulses), as illustrated in FIGURE 17e.

Figure 17E:
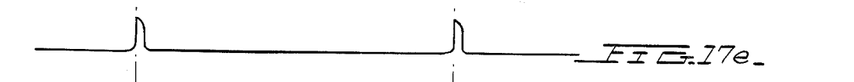

It will be observed that the resultant pulse of FIGURE 17e falls on the center of the input pulse from detector 41, shown in FIGURE 17a. It is the pulse of FIGURE 17e that is thereafter applied to amplifier 42 which is turned on for a short length of time to flash neon bulb 27 at a point corresponding to the center of the reflected sonar signal.

Alternative to the embodiment of FIGURE 16, the center of the input reflected signal can be selected through the use of a peak-rider circuit.

Figure 18:
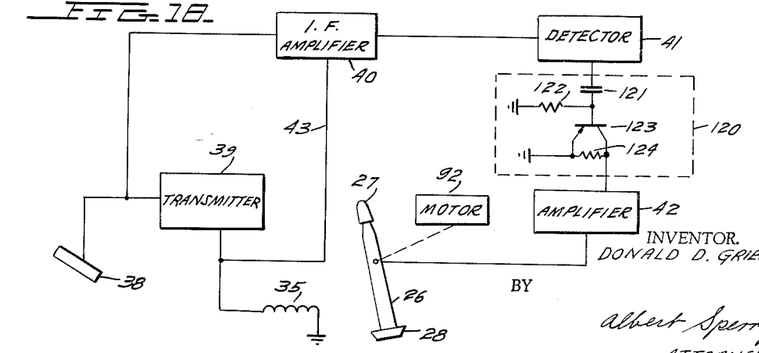
FIGURE 18 illustrates a second embodiment of a novel processing means which could be used in the embodiment of FIGURE 15, and is comprised of a peak-rider system.

The peak-rider circuit of the invention is shown in FIGURE 18, again in connection with an electrical system of the type illustrated in FIGURE 4. The peak-rider circuit is shown in dotted block 120 in FIGURE 18, and is connected between detector 41 and amplifier 42 of FIGURE 4. The circuit is comprised of an input R–C circuit which includes capacitor 121 and a resistor 122 which is connected to the base of a transistor 123. The emitter and collector are then connected in closed circuit relation with the resistor 124.

Figure 19A:
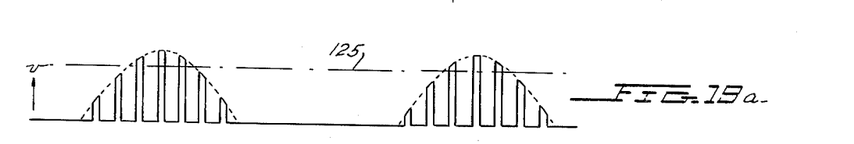
FIGURES 19a and 19b illustrate the echo signal at various stages through the processing means of FIGURE 18.

In operation, the signal detector 41, as shown in FIGURE 19a which illustrates the ouput signal of detector 41 as a function of time, is the envelope of successive echo pulses which would be received, for example, from an irregular surface. The circuit 120 is then so arranged that the smallest signal which is desired to be processed can be adequately handled by the peak-rider circuit, there being sufficient amplification for the peak-rider 120 to achieve this function.

Figure 19B:
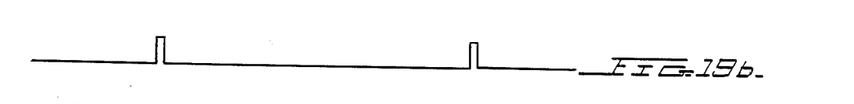

The circuit is generally unbiased, as shown, where the transistor will range through conduction to cut-off over a relatively small range of voltages. The amplitude of the pulse coming from detector 41, however, will normally be many times this range. Thus, an applied pulse will cause current to flow through resistor 122 to set up a biasing voltage across capacitor 121. The greater the amplitude of the applied signal, the higher the biasing voltage will be, and hence the effective signal acting on the input of the circuit is that portion of the pulse extending from the peak of the pulse down to a value equal to the cut-off range of the transistor circuit, shown in FIGURE 19a as peak-rider level 125. The time constant of the input circuit is, of course, equal to a period such that bias changes can occur at the pulse period so that the peak of successive pulses corresponding to the period is obtained. Therefore, the output signal passed by the peak-rider circuit will have the shape shown in FIGURE 19b which is a very short pulse occurring at the center of the input envelope. This pulse will then be amplified and then used to fire the neon tube indicator at the appropriate scale position.

Although this invention has been described with respect to its preferred embodiments it should be understood that many variations and modifications will now be obvious to those skilled in the art, and it is preferred, therefore, that the scope of this invention be limited not by the specific disclosure herein but only by the appended claims.

What is claimed is:

1. In a marine distance finding device; a first transducer means for generating and receiving pressure waves in water in a first direction, a second transducer means for generating and receiving pressure waves in water in a second direction, and indicating means connected to said first and second transducer means; said second direction being at an angle with respect to the surface of the water; said indicating means having a first calibration to indicate the distance traversed by pressure waves generated and received by said first transducer in said first direction; said indicator means having a second calibration to indicate the distance traversed by said pressure waves in said second direction times the cosine of said angle.

2. In a marine distance finding device; a first transducer means for generating and receiving pressure waves in water in a first direction, a second transducer means for generating and receiving pressure waves in water in a second direction, and indicating means connected to said first and second transducer means; said second direction being at an angle with respect to the surface of the water; said indicating means having a first calibration to indicate the distance traversed by pressure waves generated and received by said first transducer in said first direction; said indicator means having a second calibration to indicate the distance traversed by said pressure waves in said second direction times the cosine of said angle; said first direction being parallel to the surface of said water.

3. In a marine distance finding device; a first transducer means for generating and receiving pressure waves in water in a first direction, a second transducer means for generating and receiving pressure waves in water in a second direction, and indicating means connected to said first and second transducer means; said second direction being at an angle with respect to the surface of the water; said indicating means having a first calibration to indicate the distance traversed by pressure waves generated and received by said first transducer in said first direction; said indicator means having a second calibration to indicate the distance traversed by said pressure waves in said second direction times the cosine of said angle; said first direction being perpendicular to the surface of said water.

4. In a marine distance finding device; a first transducer means for generating and receiving pressure waves in water in a first direction, a second transducer means for generating and receiving pressure waves in water in a second direction, and indicating means connected to said first and second transducer means; said second direction being at an angle with respect to the surface of the water; said indicating means having a first calibration to indicate the distance traversed by pressure waves generated and received by said first transducer in said first direction; said indicator means having a second calibration to indicate the distance traversed by said pressure waves in said second direction times the cosine of said angle; said angle being 45°.

5. In a marine distance finding device; a first transducer means for generating and receiving pressure waves in water in a first direction, a second transducer means for generating and receiving pressure waves in water in a second direction, and indicating means connected to said first and second transducer means; said second direction being at an angle with respect to the surface of the water; said indicating means having a first calibration to indicate the distance traversed by pressure waves generated and received by said first transducer in said first direction; said indicator means having a second calibration to indicate the distance traversed by said pressure waves in said second direction times the cosine of said angle; said indicator having a first and second indicator scale portion of simultaneously indicating said first and second distance measurement respectively; said second indicator scale reading being reduced by the cosine of said angle with respect to said first indicator scale.

6. In a marine distance finding device; a first transducer means for generating and receiving pressure waves in water in a first direction, a second transducer means for generating and receiving pressure waves in water in a second direction, a switching means having a first and second switch position, and indicating means connected to said first and second transducer means respectively when said switching means is in said first or second switch position respectively; said second direction being at an angle with respect to the surface of the water; said indicating means having a first calibration to indicate the distance traversed by pressure waves generated and received by said first transducer in said first direction; said indicator means having a second calibration to indicate the distance traversed by said pressure waves in said second direction times the cosine of said angle; said first calibration being operable when switching means is in said first switch position; said second calibration being operable when said switching means is in said second switch position.

7. In a marine distance finding device; a first transducer means for generating and receiving pressure waves in water in a first direction, a second transducer means for generating and receiving pressure waves in water in a second direction, a switching means having a first and second switch position, and indicating means connected to said first and second transducer means respectively when said switching means is in said first or second switch position respectively; said second direction being at an angle with respect to the surface of the water; said indicating means having a first calibration to indicate the distance traversed by pressure waves generated and received by said first transducer in said first direction; said indicator means having a second calibration to indicate the distance traversed by said pressure waves in said second direction times the cosine of said angle; said first calibration being operable when said switching means is in said first switch position; said second calibration being operable when said switching means is in said second switch position; said first and second calibrations comprising respective scales on said indicating means; said second scale being compressed by the cosine of said angle with respect to said first scale.

8. In a marine distance finding device; the combination comprising a first transducer means for generating and receiving pressure waves in water in a first direction, a second transducer means for generating and receiving pressure waves in water in a second direction, a third transducer means for generating and receiving pressure waves in water in a third direction, a switching means and an indicating means; said indicating means being operable to indicate two distances measured by two of said three transducer means; said first, second and third transducer means being connected to said switching means; said switching means being operable to connect at least two different pairs of said three transducer means to said indicating means.

9. In a marine distance finding device; the combination comprising a first transducer means for generating and receiving pressure waves in water in a first direction, a second transducer means for generating and receiving pressure waves in water in a second direction, a third transducer means for generating and receiving pressure waves in water in a third direction, a switching means and an indicating means; said indicating means being operable to indicate two distances measured by two of said three transducer means; said first, second and third transducer means being connected to said switching means; said switching means being operable to connect at least two different pairs of said three transducer means to said indicating means; said first direction being vertical; said second direction being horizontal; said third direction being at an angle to the surface of the water; the distance measured in said third direction being reduced by the cosine of said angle by said indicating means.

10. In a marine distance finding device; the combination comprising a first transducer means for generating and receiving pressure waves in water in a first direction, a second transducer means for generating and receiving pressure waves in water in a second direction, a third transducer means for generating and receiving pressure waves in water in a third direction, a switching means and an indicating means; said indicating means being operable to indicate two distances measured by two of said three transducer means; said first, second and third transducer means being connected to said switching means; said switching means being operable to connect at least two different pairs of said three transducer means to said indicating means; said first direction being vertical; said second direction being horizontal; said third direction being at an angle to the surface of the water; the distance measured in said third direction being reduced by the cosine of said angle by said indicating means; said indicating means having a first, scale for indicating distance measured in said first direction and in said second direction and a second scale for indicating the cosine of said angle times said distance measured in said third direction respectively.

References Cited by the Examiner

UNITED STATES PATENTS

| 2,225,046 | 12/40 | Hunter | 343—100 |
| 2,412,003 | 12/46 | Neufeld | 343—5 |
| 2,423,024 | 12/47 | Hershberger | 343—13 |
| 2,527,753 | 10/50 | McConnell | 343—12 |
| 2,759,168 | 8/56 | Fryklund | 340—29 |
| 2,995,746 | 8/61 | Sherry et al. | 343—13 |
| 3,019,430 | 1/62 | Pedersen et al. | 343—12 |
| 3,145,364 | 8/64 | Boudigues | 340—3 |

FOREIGN PATENTS

| 353,403 | 1/30 | Great Britain. |
| 622,098 | 4/49 | Great Britain. |
| 650,447 | 2/51 | Great Britain. |
| 860,237 | 2/61 | Great Britain. |

CHESTER L. JUSTUS, *Primary Examiner.*

KATHLEEN CLAFFY, *Examiner.*